Feb. 10, 1942.       T. R. BROWN       2,272,736
ELECTRIC CONTROL SYSTEM
Filed Nov. 16, 1940
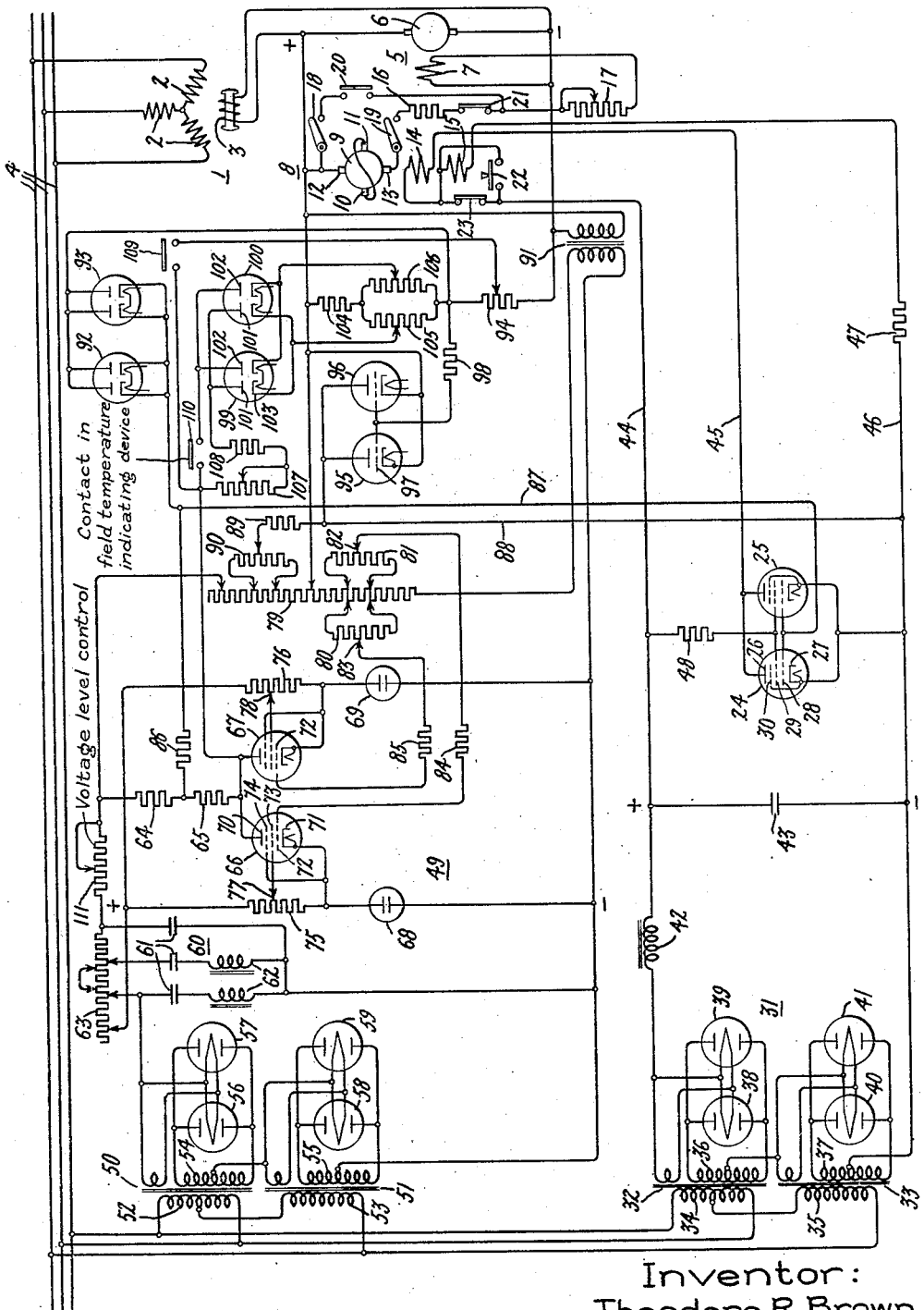
Inventor:
Theodore R. Brown,
by Harry E. Dunham
His Attorney.

Patented Feb. 10, 1942

2,272,736

UNITED STATES PATENT OFFICE 2,272,736

ELECTRIC CONTROL SYSTEM

Theodore R. Brown, Schenectady, N. Y., assignor to General Electric Company, a corporation of New York Application November 16, 1940, Serial No. 365,957

17 Claims. (Cl. 171—119)

My invention relates to electric control systems and more particularly to electric valve control systems for dynamo-electric machines.

In the provision of excitation circuits for dynamo-electric machines, it is important to incorporate apparatus which not only maintains an output condition, such as the voltage of a machine, at a substantially constant value but also effects this control in a rapid and precise manner. In accordance with the teachings of my invention described hereinafter, I provide a new and improved electric valve control system for dynamo-electric machines wherein the output voltage, or other electrical condition, is maintained substantially constant, and which includes apparatus which controls the electric valve means during the starting operation of the machine from an associated alternating current supply circuit.

It is an object of my invention to provide a new and improved electric valve control system for dynamo-electric machines.

It is another object of my invention to provide a new and improved electric valve voltage regulating circuit for dynamo-electric machines.

It is a further object of my invention to provide a new and improved electric valve control system, including an armature reaction excited machine, which controls the excitation of an alternating current dynamo-electric machine of the synchronous type.

It is a still further object of my invention to provide a new and improved control and regulating system for dynamo-electric machines of the synchronous type including an armature reaction excited machine and comprising means for assuring the transmission of a constant current to the field winding of the machine during the starting operation.

Briefly stated, in the illustrated embodiment of my invention I provide an electric valve regulating system for a dynamo-electric machine of the synchronous type, such as a synchronous condenser, wherein an armature-reaction excited machine, or exciter, or sub-exciter, is employed to maintain an electrical condition, such as the output voltage, of the synchronous condenser at a substantially constant value. Apparatus is also provided to assure the transmission of a constant current to the field winding of the synchronous machine during the starting operation. Additional apparatus is provided to prevent a reversal in polarity of the voltage applied to the field winding of the synchronous condenser and to limit the maximum energization of the field winding of the synchronous condenser.

For a better understanding of my invention, reference may be had to the following description taken in connection with the accompanying drawing, and its scope will be pointed out in the appended claims. The single figure of the drawing diagrammatically illustrates my invention as applied to an excitation system for an alternating current machine of the synchronous type.

Considering now more particularly the single figure of the drawing, my invention is there illustrated as applied to an excitation system for an alternating current dynamo-electric machine of the synchronous type, such as a synchronous condenser 1 including armature winding 2 and a field winding 3. The armature winding 2 is connected to a suitable alternating current circuit such as a polyphase alternating current circuit 4.

I may employ an exciter 5 comprising an armature winding 6 which energizes the field winding 3 of synchronous condenser 1, and which also includes a field winding 7 which controls the excitation of exciter 5 and in turn controls the energization of field winding 3 of synchronous condenser 1.

As an element of the excitation system, I employ a dynamo-electric machine 8 which is of the direct current armature reaction excited type. Certain features of the dynamo-electric machine 8 are disclosed and claimed in a copending application Serial No. 281,008 of E. F. W. Alexanderson and M. A. Edwards, filed June 24, 1939, and which is assigned to the assignee of the present application. The armature reaction excited machine 8 in the particular embodiment shown serves as a sub-exciter.

The machine 8 is provided with an armature winding 9 and is also provided with two sets of brushes; one set of brushes including brushes 10 and 11 are considered as the primary brushes and are short circuited or connected through a conductor of low resistance to provide a path for the short circuit current which produces one component of the exciting flux of the machine. The other set of brushes including brushes 12 and 13 produce a voltage which varies as the resultant of the magnetic field produced by the boost control winding 14 and the buck control winding 15. The output or secondary brushes 12 and 13 are connected to the field winding 7 of exciter 5 which constitutes a load circuit for the armature reaction excited machine 8. The armature winding 9 of machine 8 may be connected to field winding 7 through resistances 16 and 17, the latter of which may be adjustable to preestablish or preset the range of excitation of exciter 5.

Switches 18 and 19 may also be employed to close or open selectively the armature winding circuit of machine 8. A contactor (not shown) including contacts 20, 21 and 23 may be employed to control the operation of the machine 8 so that it may be either manually or automatically operated. When the contactor is in the position such that contacts 20, 21 and 23 are in the positions shown, the system is in condition for automatic operation, and when the contacts are moved to the other positions, that is when contact 20 is closed, contact 21 is open and when contact 23 is open, the system is in condition for manual operation. When in the last mentioned positions, these contacts permit the manual operation or control of the output voltage of the exciter 5 by means of resistance 111. A suitable switch, such as a push button 22, may be employed as a means for temporarily effecting energization or excitation of the control windings of machine 8.

Electric translating apparatus, including electric valve means 24 and 25 is employed for variably energizing boost control winding 15, thereby controlling the excitation and output voltage of the armature reaction excited machine 8. The electric valve means 24 and 25 are preferably of the high vacuum type each comprising an anode 26, a cathode 27, a control grid 28, a screen grid 29, and a suppressor grid 30 which is preferably connected to cathode 27. As a source of unidirectional current for energizing control windings 14 and 15, I provide a rectifier circuit 31 including transformers 32 and 33, having primary windings 34 and 35 and secondary windings 36 and 37, respectively. The primary windings 34 and 35 are Scott or T-connected, and the secondary windings 36 and 37 are connected to suitable rectifier valves 38, 39 and 40, 41 respectively. The output voltage of the rectifier valves 38—41 are connected to be additive and are connected to control windings 14 and 15 through a smoothing inductance 42. A filtering capacitance 43 may be connected across the output circuit if desired. The anode-cathode circuits of the electric valve means 24 and 25 are connected to the boost control winding 14 through conductors 44 and 45, so that the variation in the effective impedance of electric valve means 24 and 25 controls the current transmitted to this winding. On the other hand, the buck control winding 15 is connected directly across the output circuit of the rectifier 31 through a circuit including conductors 44 and 46 and including a resistance 47, so that substantially constant current is transmitted to this winding. As a means for controlling the conductivities of the electric valve means 24 and 25 in a manner to compensate for variations in the output voltage of rectifier 31 occasioned by variations in the alternating current circuit 4, I provide a circuit including a resistance 48 connected between the positive terminal of the output circuit of rectifier 31 and the screen grids 29.

I employ a control means 49 for the translating apparatus including electric valve means 24 and 25. This control means may take the form of a voltage regulating circuit such as that disclosed and claimed in a copending patent application Serial No. 274,765 of Jerry L. Stratton, filed May 20, 1939, and which is assigned to the assignee of the present application. The control means comprises a rectifier circuit which produces a unidirectional voltage which varies in response to the voltage of circuit 4 and which includes transformers 50 and 51 having primary windings 52 and 53 and secondary windings 54 and 55, respectively. The primary windings are Scott-connected or T-connected, and the rectifier valves 56, 57 and 58, 59 are connected to secondary windings 54 and 55, respectively, and in a manner so that the output voltages are additive in accordance with the features disclosed and claimed in the above-identified copending patent application S. N. 274,765. A filter circuit 60, including capacitances 61 and inductances 62, may be connected across the output circuit of the rectifier apparatus to eliminate the ripple voltage.

The control means 49 also includes means for producing a variable unidirectional control voltage which is impressed on the control grids 28 of electric valve means 24 and 25, which in turn, control the resultant excitation of the armature reaction excited machine 8. The source of unidirectional current produced by transformers 50 and 51 and electric valves 56—59 is connected to suitable impedance elements, such as resistances 64 and 65 which are connected in series relation with electric discharge devices 66, 67 and suitable constant voltage devices such as glow discharge valves 68 and 69. Electric discharge devices 66 and 67 and glow discharge valves 68 and 69, respectively, constitute parallel circuits and are employed in order to assure continuity of service of the system in the event either one of the electric discharge devices 66 or 67 becomes defective or inoperative. Electric discharge devices 66 and 67 are preferably of the high vacuum type, each comprising an anode 70, a cathode 71, a control grid 72, a screen grid 73 and a suppressor grid 74 which is preferably connected to the associated cathode 71. The glow discharge valves 68 and 69, when in a conducting condition, serve to maintain the potentials of the cathodes 71 substantially constant, thereby increasing the sensitivity of the regulating system. Suitable voltage dividers including resistances 75 and 76 are connected between the positive terminals of the glow discharge valves 68 and 69, respectively, and the positive terminal of the direct current source provided by rectifier valves 56—59. By virtue of the adjustable connections 77 and 78 a predetermined component of the voltage of the direct current source is impressed on the screen grids 73 so that the conductivity or the current conducted by the electric discharge devices 66 and 67 varies in response to the magnitude of the direct current circuit or the voltage of the alternating current circuit 4.

As a means for adjusting or preestablishing the conductivities of the electric discharge devices 66 and 67 so that these discharge devices conduct equal amounts of current, I provide a voltage divider including resistances 79, 80 and 81 having contacts 82 and 83 which are connected to control grids 72 of electric discharge devices 66 and 67 through resistances 84 and 85, respectively. In addition, this voltage divider impresses on the control grids 72 components of voltage which vary in response to the output voltage of the rectifiers and which also vary in response to the magnitude of the voltage of circuit 4, so that the conductivities of electric discharge devices 66 and 67 vary in response to these voltages. The variable unidirectional voltage produced by resistances 64 and 65 and electric discharge devices 66 and 67 is impressed on control grids 28 of electric valve means 24 and 25 through a circuit including a resistance 86, conductor 87, conductor 88, resistance 89 and a voltage divider including resistance 90.

In order to assure continuity of service in the event one of the parallel paths of the control means 49 becomes defective, the control means 49 is adjusted so that either one of the parallel paths will assume control of the system in case the other is unable to contribute its part to the operation. More particularly, the resistances 63 and 75 and 76 are designed so that if one of the glow discharge valves, such as discharge valve 68, becomes open circuited or defective, the reduction in current through resistance 63, that is through the left-hand portion of resistance 63, will assure a rise in potential of tap 78 so that the current drawn through resistances 64 and 65 becomes substantially constant for a particular value of voltage applied to the regulating means 49. It will be appreciated that the system will operate in a similar manner if the other parallel circuit, including glow discharge valve 69, becomes defective.

An anti-hunting circuit comprising a transformer 91 is connected to be responsive to the rate of change of the output or armature voltage of machine 5 and to impress a compensating voltage on the control grids 72 of electric discharge devices 66 and 67 through valves 68, 69, resistances 75 and 76 and resistances 80 and 81, respectively.

In order to prevent reversal of the armature or output voltage of machine 5, I provide a circuit including unidirectional conducting devices 92 and 93 connected between the armature or output circuit of machine 5 through a circuit including an adjustable resistance 94 and resistance 86. If the armature voltage tends to reverse, the unidirectional conducting devices 92 and 93 conduct current to produce positive voltages across resistances 86 and 64, tending to increase the current conducted by electric valve means 24 and 25 and thereby increasing the net or resultant excitation of machine 8. In addition, I provide unidirectional conducting devices 95 and 96 which are preferably of the high vacuum type comprising control grids 97. These unidirectional conducting devices are controlled in response to the polarity of the armature or output voltage of machine 5 by having control grids 97 connected to the armature circuit through a resistance 98. Upon being rendered conductive, unidirectional conducting devices 95 and 96 conduct current through resistance 89 to produce an increased negative voltage which is impressed on the cathodes 27 by electric valve means 24 and 25, thereby increasing the current conducted. In this manner, the net or resultant excitation of the machine 8 is further increased, tending to prevent a reversal in polarity of the output voltage of machine 5.

To provide a means for limiting the maximum energization of the control winding 14, and, hence, to limit the maximum or output voltage of machine 5, I provide unidirectional conducting devices 99 and 100 which are connected to limit the maximum value of positive voltage which may be impressed on control grids 28 of electric valve means 24 and 25. The unidirectional conducting devices 99 and 100 may be of the type comprising a pair of anodes 101 and 102 and cathodes 103. The cathodes 103 may be connected to the armature circuit of machine 8 through a voltage divider including a resistance 104 and resistances 105 and 106. These resistances may be provided with adjustable taps to control the potentials of the cathodes 103, thereby providing means for adjusting or controlling the current conducted by these parallel operating electric valves. The tap on resistance 105 also establishes the exciter voltage required before the overload regulation introduces the additional droop characteristic. The tap on resistance 106 also establishes the value to which the exciter voltage will be limited by the field temperature control effected through contactor 110 described hereinafter. Anodes 101 are connected together and are connected to the anodes 70 of electric discharge devices 66 and 67 through an adjustable resistance 107 and a resistance 108.

A switching means, such as a contactor 109, is connected between the armature circuit of machine 5 and the control means 49 to impress on the control grids 28 of electric valve means 24 and 25 a predetermined component of the armature voltage so that the output or armature voltage of machine 5 remains constant and, which in turn, transmits a substantially constant field current to synchronous condenser 1. When the contactor 109 is closed, a predetermined variable component of voltage is impressed on the control grids 28 of electric valve means 24 and 25 so that a constant current is transmitted to the field winding 3 of machine 1. The contactor 109 may be operated by suitable apparatus (not shown) and may be operated in response to starting apparatus for the synchronous condenser 1, so that a constant current is transmitted to the field winding 3 of condenser 1 during a period of the starting sequence of operation. A further switch or contactor 110 may be connected in the circuit including unidirectional conducting devices 99 and 100 to limit the maximum value of field current transmitted to synchronous condenser 1. Contactor 110 may be actuated by apparatus (not shown) such as a field temperature responsive or indicating device which is actuated in response to the temperature of the field winding of synchronous condenser 1.

Suitable means such as a resistance 111 may be connected between the source of variable unidirectional voltage provided by the rectifiers including transformers 50 and 51 and valves 56—59 and electric valves 66 and 67 in order to establish or preset the voltage level or the magnitude of the voltage which is maintained in alternating current circuit 4. Resistance 111 may be adjustable so that the voltage which is maintained by the regulating system is adjustable or controllable.

The operation of the embodiment of my invention shown in the single figure will be explained by considering the system when it is operating to control the excitation of synchronous condenser 1 in response to the voltage of the alternating current circuit 4.

Variable amounts of field current are transmitted to field winding 3 of synchronous condenser 1 of exciter 5. The current transmitted to field winding 7 of exciter 5 is determined by the difference or the sum of the armature voltage of exciter 5 and the armature voltage of the armature reaction excited machine 8. The output voltage of the armature reaction excited machine 8 may either oppose or assist the armature voltage of machine 5 and thereby controls the current transmitted to field winding 7. Of course, the output voltage of the machine 8 is substantially less than the armature voltage of machine 5.

The output or armature voltage of machine 8 is determined by the difference in the magnetomotive forces produced by the boost field winding 14 and the buck control winding 15. Control winding 15, inasmuch as it is connected across a source of substantially constant voltage, produces a constant magnetomotive force, whereas the magnetomotive force of the boost control winding 14 is varied in response to the voltage of circuit 4. The resultant or difference in the magnetomotive forces determines the output voltage of current of machine 8. Switch 19 is, of course, closed so that the armature of machine 8 is connected to variably energize field winding 7 of exciter 5.

Control means 49 impresses a variable unidirectional voltage on control grids 28 of electric valve means 24 and 25 to control the current conducted by these electric valve means. This unidirectional voltage varies in response to the voltage of circuit 4 and the manner in which that voltage is produced will now be considered. The magnitude of the unidirectional voltage produced by the rectifiers, including transformers 50 and 51 and rectifier valves 56—59, varies in response to the magnitude of the polyphase voltages of circuit 4. Electric discharge devices 66 and 67 transmit variable amounts of unidirectional current through resistances 64 and 65, the conductivities of these discharge devices being controlled by the variable unidirectional voltages impressed on control grids 72 and screen grids 73. This unidirectional voltage produced by the variable amounts of unidirectional current transmitted through resistance 64 is impressed on control grids 28 of electric valve means 24 and 25. For example, if the voltage of the alternating current circuit 4 rises above the predetermined or preestablished value, electric discharge devices 66 and 67 conduct an increased amount of current to increase the voltage drop across resistance 64. Consequently, the potential impressed on control grids 28 of electric valve means 24 and 25 is decreased and the current conducted by these electric valve means is correspondingly decreased, effecting a reduction in the current transmitted to the boost control winding 14 of machine 8. As a result, the excitation of machine 8 is reduced and the output voltage thereof and the excitation of exciter 5 and synchronous condenser 1 are correspondingly reduced, tending to restore the voltage of circuit 4 to the desired value. If the voltage of the alternating current circuit 4 tends to fall below the preestablished value, the reverse operation takes place effecting an increase in the value of current transmitted to field winding 3 and tending to raise the armature or output voltage of condenser 1 to the desired value.

The system also prevents reversal of the armature or output voltage of machine 5. This operation is obtained by virtue of the unidirectional conducting devices 92 and 93 and the unidirectional conducting devices 95 and 96. If the output or armature voltage of machine 5 should tend to reverse, unidirectional conducting devices 92 and 93 conduct current through resistances 64 and 86 tending to raise the potential of control grids 28 of electric valve means 24 and 25, thereby increasing the energization of control winding 14 and thereby preventing a reversal of excitation. This action is assisted by the operation of the unidirectional conducting devices 95 and 96 which, as the armature voltage tends to reverse, are rendered conducting thereby transmitting a current through resistance 89 and producing thereacross a negative voltage which tends to lower the potential of the cathodes 27 of electric valve means 24 and 25, thereby further increasing the current conducted by these electric valve means and tending to increase still further the energization of control winding 14. In this manner, it is assured that the output voltage of machine 5 will not be reversed in polarity.

If the contactor 110 is closed due to the rise in temperature of field winding 3 by virtue of operation of apparatus not shown, indicating that the maximum condition field temperature has been attained, the potential between the positive terminal of the exciter bus and the tap on resistance 106 will not be permitted to rise more than the voltage drop across resistance 65. This action limits the exciter armature voltage to a predetermined value.

In the event the load imposed on synchronous condenser 1, as indicated by the excitation or armature voltage, tends to rise above a predetermined value, the unidirectional conducting devices 99 and 100 conduct current through resistances 64 and 65 which is proportional to the amount of the overload, thereby limiting the maximum voltage which is impressed on the control grids 28 of electric valve means 24 and 25.

When contactor 109 is closed, the control means 49 is rendered substantially ineffective and a predetermined component of the armature voltage of machine 5 is employed to control the conductivities of electric valve means 24 and 25 and, hence, control or maintain the armature voltage of machine 5 at a predetermined value. By holding the armature voltage at a definite value a predetermined constant field current will be transmitted to the field winding 3 of synchronous condenser 1. Upon closure of contactor 109 a predetermined component of armature voltage of machine 5 is impressed on control grids 28 of electric valve means 24 and 25 through the circuit including resistance 94, contactor 109, resistance 65, resistance 86, conductor 87, conductor 88, resistance 89 and portions of resistances 90 and 79. In this manner, the above described circuit operates as a voltage controlling element to maintain the armature voltage of exciter 5 at a substantially constant value. When the armature voltage tends to rise, the voltage impressed on grids 28 is lowered; and conversely, when the armature voltage tends to decrease the grid voltage rises. This operation is accomplished by using the variable voltage drop across resistances 65 and 86.

It should be noted that the control means 49 is energized through a circuit independent of the rectifiers which energize the electric valve means 24 and 25, so that the control means is not influenced by variations in control current transmitted to boost winding 14. It will be appreciated that it is important to vary the current transmitted to the field winding 14 very rapidly. Consequently, in order to obtain precision of control, it has been found desirable to separate these two parts of the system.

Inasmuch as the buck control winding 15 is connected directly across the output circuit of rectifier 31, it is desirable to increase the current to the boost control winding 14 upon an increase in the energization of winding 15 occasioned by a temporary rise in voltage of circuit 4. A compensatory variation in the energization of winding 14 is accomplished by means of the variation in voltage impressed on the screen grids 29 through resistance 48 which automatically increases the current transmitted to the boost control winding 14 as the output voltage of rectifier 31 increases. In this manner, the energization of winding 14 is automatically varied to compensate for changes in the energization of winding 15 occasioned by variations in the output voltage of rectifier 31.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo-electric machine comprising an armature winding and a field winding, an alternating current circuit connected to said armature winding, electric apparatus for controlling the energization of said field winding and comprising an armature-reaction excited dynamo-electric machine including a control winding, electric translating apparatus connected between said alternating current circuit and said control winding and including an electric valve means for controlling the current transmitted to said control winding, said electric valve means including a control member, a control means connected to said alternating current circuit for variably energizing said control member, and switching means for rendering ineffective said control means by impressing a voltage on said control member so that constant current is transmitted to the field winding of the first mentioned dynamo-electric machine.

2. In combination, a dynamo-electric machine comprising an armature winding and a field winding, an alternating current circuit connected to said armature winding, electric apparatus for controlling the energization of said field winding and comprising an armature-reaction excited dynamo-electric machine including a control winding, electric translating apparatus connected between said alternating current circuit and said control winding and including an electric valve means for controlling the current transmitted to said control winding, said electric valve means including a control member, a voltage controlling circuit connected to said alternating current circuit for impressing a variable voltage on said control member to maintain the voltage of said alternating current circuit substantially constant, and switching means for rendering ineffective said voltage controlling circuit comprising means for impressing on said control member a voltage so that constant current is transmitted to the field winding of the first mentioned dynamo-electric machine.

3. In combination, a dynamo-electric machine comprising an armature winding and a field winding, an alternating current circuit connected to said armature winding, electric apparatus for controlling the energization of said field winding and comprising an armature-reaction excited dynamo-electric machine including a control winding, electric translating apparatus connected between said alternating current circuit and said control winding and including electric valve means for controlling the current transmitted to said control winding, said electric valve means including a grid, a voltage regulating circuit connected to said alternating current circuit and comprising an amplifier for variably energizing said grid, and switching means for effectively shunting said regulating circuit to impress a voltage on said grid so that constant current is transmitted to the field winding of the first mentioned dynamo-electric machine.

4. In combination, an alternating current circuit, a dynamo-electric machine having an armature winding connected to said circuit and including a field winding, electric apparatus for controlling the energization of said field winding and comprising an armature-reaction excited machine including a control winding, control means connected to said alternating current circuit and responsive to an electrical condition thereof and comprising electric valve means for variably energizing said control winding, said electric valve means having a control member for determining the current conducted thereby, means responsive to said control means for impressing a variable voltage on said control member to control the current transmitted to said control winding, and switching means connected between said control means and said control member for rendering said control means ineffective by impressing on said control member a variable voltage to assure the transmission of a substantially constant current to the field winding of said dynamo-electric machine.

5. In combination, an alternating current circuit, a dynamo-electric machine having an armature winding and a field winding, the armature winding being connected to said alternating current circuit, electric apparatus for controlling the energization of said field winding and comprising a dynamo-electric machine of the armature-reaction excited type and including a control winding, electric translating apparatus connected between said alternating current circuit and said control winding and including electric valve means having a grid, a voltage responsive circuit connected to said alternating current circuit and comprising a serially connected impedance device and electric discharge device for producing a unidirectional voltage which varies in response to the magnitude of the voltage of said alternating current circuit, an amplifier connected between the voltage regulating circuit and said grid, and means connected between said voltage responsive circuit and said amplifier for rendering said voltage responsive circuit ineffective by impressing a variable voltage on said grid so that constant current is transmitted to the field winding of the first mentioned machine.

6. In combination, a load circuit, a dynamo-electric machine of the armature reaction excited type for energizing said load circuit and comprising a control winding, electric translating apparatus for energizing said control winding and including electric valve means having a control grid, control means for impressing a variable voltage on said control grid comprising a source of direct current and a serially connected impedance element and an electric discharge device, and switching means for shunting said control means to maintain the voltage of the load circuit constant.

7. In combination, a load circuit, apparatus including a dynamo-electric machine of the armature reaction excited type comprising an armature winding connected to said load circuit and having a control winding, means for supplying variable amounts of unidirectional current to said control winding to control the current transmitted to said load circuit, control means for said last mentioned means, and means connected between said armature circuit and said control means comprising a unidirectional conducting device for controlling said control means to prevent reversal in polarity of the voltage of said load circuit.

8. In combination, a load circuit, apparatus including a dynamo-electric machine of the armature reaction excited type comprising an armature winding connected to said load circuit and including a control winding, electric valve means for controlling the energization of said control winding and comprising a control member, control means for impressing a variable voltage on said control member to control the current transmitted to said load circuit, and means connected between said load circuit and said control means for controlling said control means to prevent reversal in the polarity of the voltage applied to said load circuit.

9. In combination, a load circuit, apparatus including a dynamo-electric machine of the armature reaction excited type comprising an armature winding connected to said load circuit and including a control winding, electric translating apparatus comprising an electric valve means for transmitting variable amounts of unidirectional current to said control winding, said electric valve means including a control member, control means for impressing a variable voltage on said control member and comprising a source of direct current and a serially connected impedance element and an electric discharge device for transmitting variable amounts of an unidirectional current through said impedance element, and a unidirectional conducting device connected between said control means and said load circuit for preventing reversal in polarity of the voltage applied to said load circuit.

10. In combination, a load circuit, a direct current dynamo-electric machine of the armature reaction excited type comprising an armature winding connected to said load circuit and including a control winding, supply means for transmitting variable amounts of unidirectional current to said control winding to control the current transmitted to said load circuit, control means for said supply means, means comprising a unidirectional conducting device connected between said load circuit and said control means to prevent reversal in polarity of the voltage of said load circuit, and means comprising a unidirectional conducting device connected between said load circuit and said control means to limit the maximum amount of current transmitted to said control winding.

11. In combination, a load circuit, apparatus including a dynamo-electric machine of the armature reaction excited type comprising an armature winding connected to said load circuit and having a pair of opposing control field windings, means for supplying a substantially constant current to one of said field windings, apparatus for supplying a variable current to the other field winding, control means for said apparatus, and a unidirectional conducting device connected between said load circuit and said control means for preventing reversal in polarity of the voltage applied to said load circuit.

12. In combination, a load circuit, apparatus including a dynamo-electric machine of the armature reaction excited type comprising an armature winding connected to said load circuit and having a pair of opposing control field windings, means for supplying a substantially constant current to one of said field windings, apparatus for supplying a variable current to the other field winding, control means for producing a variable voltage for controlling said apparatus, and means for controlling said voltage to prevent reversal in polarity of the voltage of said load circuit comprising a unidirectional conducting means connected between said load circuit and said control means.

13. In combination, a load circuit, apparatus including a dynamo-electric machine of the armature reaction excited type comprising an armature winding connected to said load circuit and having a pair of opposing control field windings, means for supplying a substantially constant current to one of said field windings, electric translating apparatus including an electric valve means for transmitting variable amounts of unidirectional current to the other field winding, said electric valve means having an anode, a cathode and a control grid, means for impressing a variable voltage on said grid, and means comprising a unidirectional conducting means connected between said load circuit and said control means to prevent reversal in polarity of the voltage supplied to said load circuit.

14. In combination, a load circuit, apparatus including a dynamo-electric machine of the armature reaction excited type comprising an armature winding connected to said load circuit and having a pair of opposing control field windings, means for supplying a substantially constant current to one of said field windings, electric translating apparatus including an electric valve means for transmiting variable amounts of unidirectional current to the other field winding, said electric valve means having an anode, a cathode and a control grid, control means for impressing on said grid a variable unidirectional voltage the magnitude of which determines the amount of current transmitted to said other field winding, and means including a unidirectional conducting device connected between said load circuit and said control means for preventing reversal in polarity of the voltage of said load circuit.

15. In combination, a load circuit, apparatus including a dynamo-electric machine of the armature reaction excited type comprising an armature winding connected to said load circuit and having a pair of opposing control field windings, means for supplying a substantially constant current to one of said field windings, electric translating apparatus including an electric valve means for transmitting variable amounts of unidirectional current to the other field winding, said electric valve means having an anode, a cathode and a control grid, control means for impressing on said grid a variable unidirectional voltage to control the amount of current transmitted to said other field winding, means including a unidirectional conducting device connected between said load circuit and said control means to control said unidirectional voltage to prevent reversal in polarity of the armature voltage of said machine by raising the potential of the grid relative to the cathode, and a second means for preventing reversal in polarity of the armature voltage of said machine comprising a controlled electric discharge device responsive to the armature voltage of said machine for lowering the potential of said cathode.

16. In combination, a direct current load circuit, a dynamo-electric machine of the direct current type having an armature winding connected to said load circuit and having a field winding, a dynamo-electric machine of the armature reaction excited type having an armature winding connected to said field winding and having a control winding, means for variably energizing said control winding to control the armature voltage of the first mentioned machine, and means for controlling the energization of said control winding to prevent reversal in polarity of the armature voltage of the first mentioned machine.

17. In combination, a direct current load circuit, a dynamo-electric machine of the direct current type having an armature winding connected to said load circuit and having a field winding, means for variably energizing said field winding comprising an armature reaction excited machine connected in circuit with said field winding and the armature winding of the first mentioned machine and comprising a control winding, means for variably energizing said control winding so that the armature voltage of said armature reaction excited machine aids or opposes the armature voltage of the first mentioned machine to control the energization of said field winding, and means for controlling the last mentioned means to prevent reversal in the polarity of the armature voltage of said first mentioned machine.

THEODORE R. BROWN.